(No Model.)
J. W. JACOBS.
BICYCLE SUPPORT.
No. 583,750. Patented June 1, 1897.
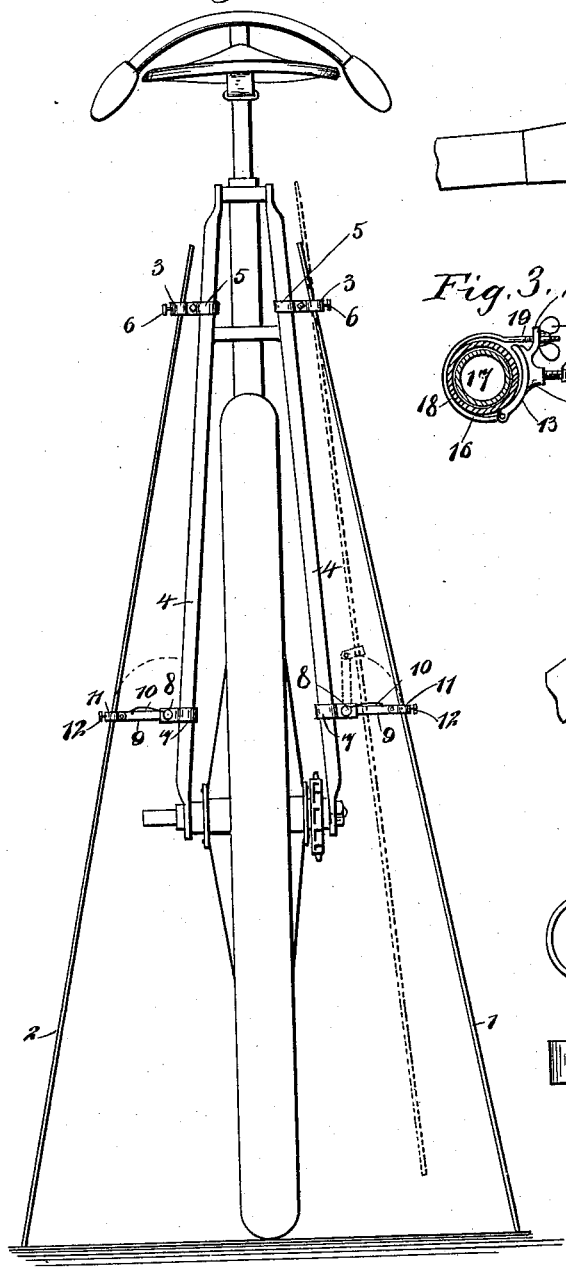
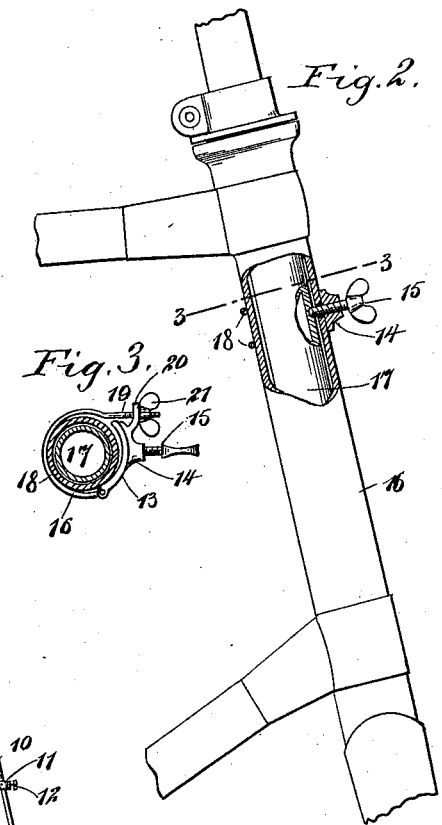
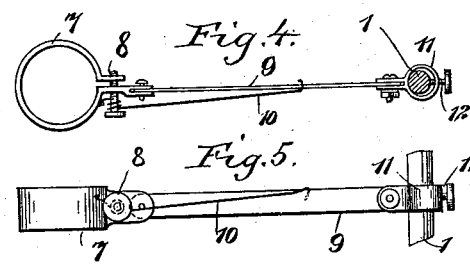
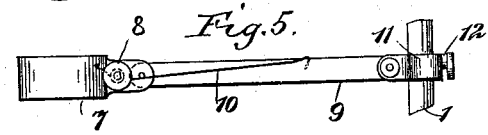
WITNESSES:
INVENTOR
J. W. Jacobs
BY
ATTORNEYS.

UNITED STATES PATENT OFFICE.

JAMES W. JACOBS, OF JEFFERSONVILLE, INDIANA, ASSIGNOR OF ONE-HALF TO EMMONS B. JACOBS, OF SAME PLACE.

BICYCLE-SUPPORT.

SPECIFICATION forming part of Letters Patent No. 583,750, dated June 1, 1897.

Application filed July 23, 1896. Serial No. 600,246. (No model.)

*To all whom it may concern:*

Be it known that I, JAMES W. JACOBS, of Jeffersonville, in the county of Clark and State of Indiana, have invented a new and Improved Bicycle-Support, of which the following is a full, clear, and exact description.

This invention relates to devices for supporting a bicycle in a vertical position after a rider shall have dismounted; and the object is to provide a support that may be transported or carried with the bicycle, and therefore always at hand for use, thus obviating the necessity of hunting up a post, wall, or the like against which to lean the wheel; and a further object is to provide means for holding the front wheel in alinement with the rear wheel when the supporting devices are in engagement with the ground.

I will describe a bicycle-support embodying my invention and then point out the novel features in the appended claims.

Reference is to be had to the accompanying drawings, forming a part of this specification, in which similar characters of reference indicate corresponding parts in all the views.

Figure 1 is a rear elevation of a bicycle, showing my invention as applied thereto. Fig. 2 is a side elevation of a portion of a bicycle-frame, showing a means for holding the front wheel in alinement with the rear wheel. Fig. 3 is a section through the line 3 3 of Fig. 2. Fig. 4 is a top view of a support-holding device employed. Fig. 5 is a side view thereof, and Fig. 6 is a plan view of a guide employed.

In carrying out my invention I employ two rods or bars 1 2, one arranged at each side of the rear wheel and connected, respectively, to the forked members of said rear wheel and adapted for adjustment longitudinally of said forked members. As here shown, the upper portion of each supporting-rod is movable through a guide-ring 3, secured to a fork member 4 by means of a clip-ring 5. The clip-ring 5 has outwardly-extended perforated lugs through which clamping-bolts extend, the said clamping-bolt also extending through a perforation in the shank portion of the guide-ring 3. By this construction the guide-ring may be adjusted at any desired angle with relation to the fork member and secured thereto by means of the clamping-bolt, which also secures the clamping-ring 5 around the fork member. The guide-ring 3 is provided with a set-screw 6, designed to impinge against a supporting-rod and secure the same as adjusted.

To the lower portion of the fork member 4 is attached a clamping-collar 7, having outwardly-extended lugs provided with perforated openings through which a set-screw 8 extends. To one of these outwardly-extended lugs is pivotally attached an arm 9, normally pressed downward by means of a spring 10, the free end of which engages the upper edge of said arm, the inner end being secured to the clamp-collar 7, and, as here shown, this inner portion of the spring may have one or two turns around the screw 8. To the outer end of the arm 9 is pivotally connected a ring 11, through which the supporting-rod extends, as plainly indicated in the drawings. The ring 11 is provided with a set-screw 12, designed to impinge against the supporting-rod. It will be seen that the lower connections between the supporting-rods and fork members are somewhat longer than the upper connections. Therefore the two supporting-rods will diverge considerably at their lower ends, or, in other words, extend at a considerable angle to a vertical line of the bicycle, thus effectually preventing the tipping of the bicycle laterally.

In Fig. 1 the supporting-rods are shown in a position to support a bicycle. When it is desired, however, to raise the same out of engagement with the ground, the set-screws 6 will be loosened, and then the said rods may be drawn upward. The pivotal connection between the arm 9 and the parts 7 and 11 will cause said supporting-rods to move inward during their upward movement substantially to the position indicated in dotted lines at the right-hand side of Fig. 1. When in this upper position, the rods may be secured by tightening the set-screws 6. The weight of the rods 1 and 2 and the springs 10 will cause them to move automatically downward to their supporting position upon releasing the set-screws 6.

In connection with the supporting device as described above I employ means for holding the front wheel in alinement with the rear wheel, this being considered necessary in order that said front wheel may not turn transversely of the rear wheel and form an obstruction or cause the turning of the bicycle to the right or to the left. This means comprises a segmental plate 13, having an interiorly-threaded lug 14, through which a set-screw 15 passes, and is designed to pass through an opening in the front tube 16 of the bicycle-frame and impinge against and engage in a notch formed in the steering-rod or tube 17, connecting with the front fork of the bicycle.

Pivotally connected to one end of the segmental plate 13 are rings 18, designed to pass around the tube 16 and terminating in a screw-threaded shank 19, which passes through a perforation in a finger 20, extended outward from the end of the plate 13 opposite that to which the rings 18 are pivoted. At the outer side of the finger 20 a set-nut 21 is engaged with the shank 19. Obviously by tightening this set-nut 21 the segmental plate 13 may be tightly clamped to the tube 16, and also after turning the front wheel into alinement with the rear wheel it may be held in this position by means of the screw 15, as above described. For the sake of lightness the rods 1 2 may be tubular.

Having thus described my invention, I claim as new and desire to secure by Letters Patent—

1. A bicycle-support comprising rods, one arranged at each side of the rear fork of the bicycle-frame, clip-rings secured to the upper portion of the rear fork members, guide-rings mounted to swing on said clip-rings and through which the rods may move, clamping-bolts for holding the guide-rings as adjusted, clamping-collars at the lower ends of the fork members, arms pivotally connected to said collars, springs for normally pressing the arms downward, and rings pivotally connected to the outer ends of the arms and through which the rods may move, substantially as specified.

2. In a support for a bicycle, the combination with a supporting-rod, of a clamp-ring for engagement around a rear member of the fork of the bicycle-frame and having outwardly-extended perforated lugs, a set-screw engaging a thread in the perforations of said lugs, an arm pivotally connected to one of said lugs, a ring having a shank portion pivotally connected to the opposite end of said arm and through which the supporting-rod is designed to pass, a clamp-screw carried by the ring for engagement with the rod, and a spring attached at one end to the clamping-ring and at its other end bearing upon the upper side of said arm, substantially as specified.

JAMES W. JACOBS.

Witnesses:
DUNCAN E. KINCAID,
FRANK R. WILLEY.